United States Patent
Rolia (10) Patent No.: US 7,310,672 B2
(45) Date of Patent: Dec. 18, 2007

(54) METHOD AND SYSTEM FOR EXPLOITING SERVICE LEVEL OBJECTIVES TO ENABLE RESOURCE SHARING IN A COMMUNICATION NETWORK HAVING A PLURALITY OF APPLICATION ENVIRONMENTS

(75) Inventor: Jerome Rolia, Kanata (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 693 days.

(21) Appl. No.: 09/991,339

(22) Filed: Nov. 13, 2001

(65) Prior Publication Data

US 2003/0093527 A1    May 15, 2003

(51) Int. Cl.
*G06F 15/173*  (2006.01)
*G06F 17/50*  (2006.01)
*G06F 9/45*  (2006.01)
*G06G 7/62*  (2006.01)

(52) U.S. Cl. .................. 709/226; 709/223; 703/13; 703/22

(58) Field of Classification Search ........... 709/104, 709/200, 201, 224, 226, 229, 223; 703/2, 703/13, 22
See application file for complete search history.

(56) References Cited

U.S. PATENT DOCUMENTS

| | | | |
|---|---|---|---|
| 5,367,473 A * | 11/1994 | Chu et al. .................. 702/186 |
| 5,745,652 A * | 4/1998 | Bigus .......................... 706/14 |
| 6,003,079 A * | 12/1999 | Friedrich et al. ........... 709/224 |
| 6,086,618 A * | 7/2000 | Al-Hilali et al. ................ 703/2 |
| 6,185,598 B1 * | 2/2001 | Farber et al. ............... 709/200 |
| 6,279,039 B1 * | 8/2001 | Bhat et al. .................. 709/226 |
| 6,459,682 B1 * | 10/2002 | Ellesson et al. ............ 370/235 |
| 6,460,082 B1 * | 10/2002 | Lumelsky et al. .......... 709/226 |
| 6,591,262 B1 * | 7/2003 | MacLellan et al. ............ 707/2 |
| 6,654,807 B2 * | 11/2003 | Farber et al. ............... 709/225 |
| 6,665,701 B1 * | 12/2003 | Combs et al. .............. 718/104 |
| 6,691,148 B1 * | 2/2004 | Zinky et al. ................ 709/201 |
| 6,704,873 B1 * | 3/2004 | Underwood ................. 726/12 |
| 6,718,358 B1 * | 4/2004 | Bigus et al. ................ 718/100 |
| 6,728,748 B1 * | 4/2004 | Mangipudi et al. ......... 718/105 |
| 6,804,714 B1 * | 10/2004 | Tummalapalli ............. 709/224 |
| 6,807,522 B1 * | 10/2004 | Orfali .......................... 703/22 |
| 6,816,905 B1 * | 11/2004 | Sheets et al. ............... 709/226 |
| 6,857,020 B1 * | 2/2005 | Chaar et al. ................ 709/226 |
| 6,862,622 B2 * | 3/2005 | Jorgensen ................... 709/226 |
| 6,877,035 B2 * | 4/2005 | Shahabuddin et al. ...... 709/226 |
| 6,954,739 B1 * | 10/2005 | Bouillet et al. ............... 705/63 |
| 7,000,013 B2 * | 2/2006 | Mei et al. ................... 709/223 |
| 7,006,435 B1 * | 2/2006 | Davies et al. ............... 370/230 |

(Continued)

Primary Examiner—William Vaughn
Assistant Examiner—Kristie Shingles (57) ABSTRACT

A method and system for resource sharing in a communication network supporting a plurality of application environments. Specifically, one embodiment of the present invention discloses a method ensuring only sufficient computational resources are used by a multi-component system as needed to meet system, subsystem, and/or component-level service level objectives. Demand values are calculated for a plurality of components in an application environment. The demand values are calculated from throughput and utilization metrics collected at each of the plurality of components. Response time metrics are predicted from the demand values. The application environment is modeled in response to the response time metrics to determine the optimum number of computational resources needed for each of the components in satisfying a functional objective. A dynamic resource manager communicates with a plurality of component managers, one for each of the plurality of components, to allocate computational resources throughout the application environment.

30 Claims, 6 Drawing Sheets

U.S. PATENT DOCUMENTS

| | | |
|---|---|---|
| 7,020,697 B1 * | 3/2006 | Goodman et al. .......... 709/223 |
| 7,054,934 B2 * | 5/2006 | Graupner et al. ........... 709/226 |
| 7,054,943 B1 * | 5/2006 | Goldszmidt et al. ........ 709/229 |
| 7,124,188 B2 * | 10/2006 | Mangipudi et al. ......... 709/226 |
| 7,165,115 B2 * | 1/2007 | Bouillet et al. ............. 709/232 |
| 2004/0136379 A1 * | 7/2004 | Liao et al. ............. 370/395.21 |

* cited by examiner

METHOD AND SYSTEM FOR EXPLOITING SERVICE LEVEL OBJECTIVES TO ENABLE RESOURCE SHARING IN A COMMUNICATION NETWORK HAVING A PLURALITY OF APPLICATION ENVIRONMENTS

TECHNICAL FIELD

The present invention relates to the field of quality of service measurement and control in computer systems. More specifically, the present invention relates to resource sharing in a communication network having a plurality of application environments.

BACKGROUND ART

Application environments are characterized by one or more independent computer systems in one or more administrative domains that are loosely coupled by networks and cooperate to provide computing resources for a global application. The extent and capabilities of each administrative domain are usually determined by the network boundaries of each distinct supplier or service provider.

For example, to break down complexity for a web-based communication network, an application environment could comprise a multi-component system, where each component is an administrative domain. The components can include a web server component, an application component, a database component, among others. The application environment is descriptive of many web shopping systems, but is also applicable to local networks servicing specific business enterprises supporting a specific need, such as application environments set up specifically for processing payroll.

Previously, application environments were optimized according to a single and static condition, e.g., a peak load condition. As such, the application environment would be originally configured to ensure operation even under peak load conditions. In particular, each of the components of the application environment would be configured accordingly to contain the correct ratio of computational resources (e.g., CPUs, database storage resources, networking resources, etc.) as compared to the other components under peak load conditions. Moreover, the application environment would be optimized to contain the maximum number of computational resources.

As such, a specific problem in the prior art application network is that dedicated computational resources (e.g., computer processing units (CPUs), memory, etc.) would go unused thereby wasting usable computational resources. Since peak load conditions may occur infrequently, the application environment was not configured to efficiently use its computational resources some of the time.

Another problem associated with the prior art is the inability of the application environment to easily meet changing demands or an increasing number of users. A change in focus or demand would necessarily change the optimization parameters for each of the components in the application environment. For example, in the web shopping scenario, if an application environment was originally configured to support shopping for appliances via a single image and text interface, the number of resources in the application environment would change if the focus of the application environment were subsequently changed to support shopping for appliances via a video and text interface. Also, if user demand shifted from supporting one line of products to a sudden demand for two or more lines of products, the number of resources in the application environment may have to change to support the new demand. In another scenario, the number of resources needed would also change if the focus of the application environment is changed, such as, when changing from an environment supporting retail to one supporting scientific research. Similarly, if the number of users increased beyond that envisioned under peak load conditions, the original configuration would be unable to handle the newer peak load conditions.

Thus a need exists for ensuring efficient use of computational resources when meeting quality of service objectives in an application environment. Another need exists for effectively supporting changing demands on the application environment.

DISCLOSURE OF THE INVENTION

The present invention provides a method and system for enabling resource sharing in a communication network supporting a plurality of application environments. The present invention provides for efficient use of computational resources (e.g., host computer, storage resources, networking resources, etc.) when meeting quality of service objectives in an application environment. Also, the present invention provides for effectively supporting changing demands on the application environment.

Specifically, one embodiment of the present invention discloses a method ensuring only sufficient computational resources are used by a multi-component system as needed to meet system-wide and/or component-level service level objectives. Demand values are calculated for a plurality of components in an application environment. The demand values are calculated from throughput and utilization metrics collected at each of the plurality of components. Response time metrics are predicted from the demand values using prediction modeling, or if possible are measured. Thereafter, the application environment is modeled in response to the response time metrics to determine the optimum number of computational resources needed for each of the components in satisfying a functional objective. A dynamic resource manager communicates with a plurality of component managers, one for each of the plurality of components, to allocate computational resources throughout the application environment.

These and other technical advantages of the present invention will no doubt become obvious to those of ordinary skill in the art after having read the following detailed description of the preferred embodiments which are illustrated in the various drawing figures.

The drawings referred to in this description should be understood as not being drawn to scale except if specifically noted.

BEST MODES FOR CARRYING OUT THE INVENTION

Reference will now be made in detail to embodiments of the present invention, a method for ensuring efficient use of computational resources in an application environment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "calculating," or "predicting," or "modeling," or "allocating," or "receiving," or "inputting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT OF THE PRESENT INVENTION

Figure 1:
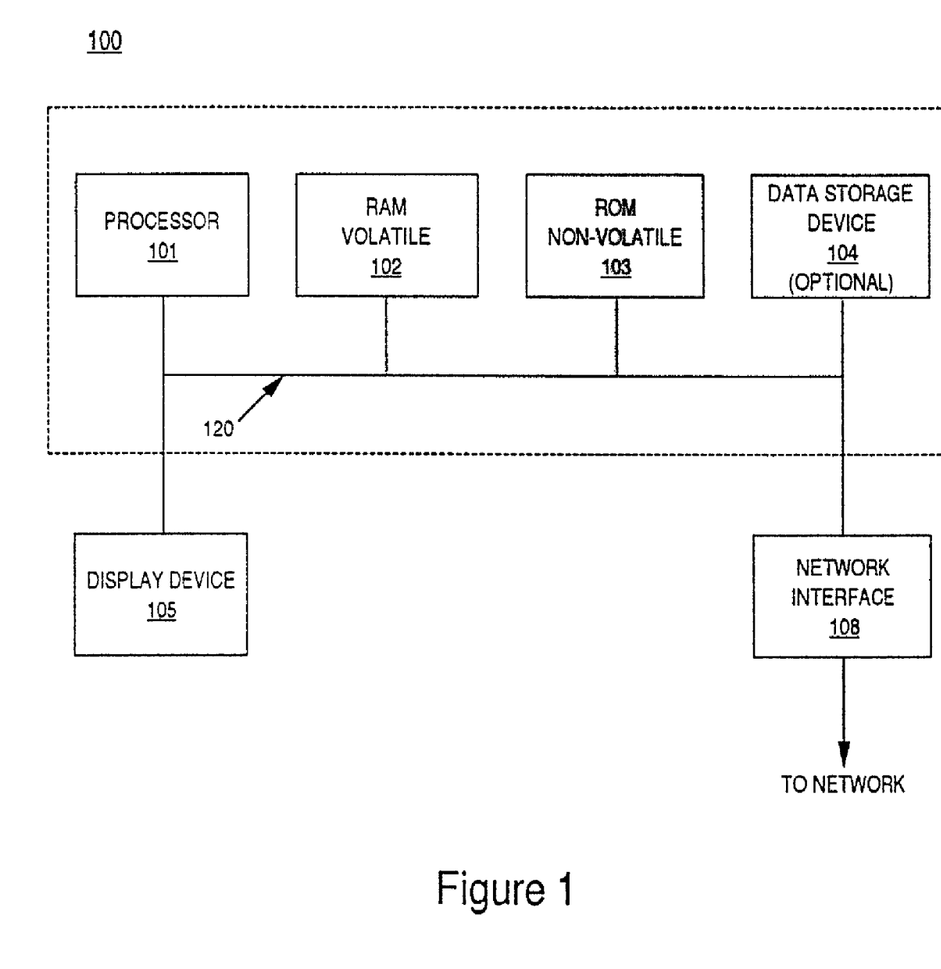
FIG. 1 illustrates a block diagram of an exemplary computer system that is capable of ensuring only sufficient computational resources are used by a multi-component application environment, in accordance with various embodiments of the present invention.

Referring now to FIG. 1, portions of the present invention are comprised of computer-readable and computer-executable instructions which reside, for example, in computer-readable media of a computer system, such as, a dynamic resource manager, a component manager, a database server, and the like, in an application environment. FIG. 1 is a block diagram of interior components of an exemplary computer system 100, upon which embodiments of the present invention may be implemented.

FIG. 1 illustrates circuitry of an exemplary computer system 100. Exemplary computer system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary computer system 100 also includes an optional data storage device 104 (e.g., memory card, hard drive, etc.) coupled with the bus 120 for storing information and instructions. Data storage device 104 can be removable. Exemplary computer system 100 also contains an optional electronic display device 105 coupled to the bus 120 for displaying information to a user. The display device 105 utilized with the computer system 100 may be a liquid crystal device, cathode ray tube (CRT), field emission device (FED, also called flat panel CRT) or other display device.

With reference still to FIG. 1, an optional signal Input/Output device 108 which is coupled to bus 120 for providing a communication link between computer system 100 and a network environment is described. As such, signal Input/Output device 108 enables the central processor unit 101 to communicate with or monitor other electronic systems coupled to a communication network.

Resource Sharing in Application Environments

Accordingly, the present invention provides a method and system for enabling resource sharing in a communication network supporting a plurality of application environments. The present invention provides for efficient use of computational resources (e.g., host computer, storage resources, networking resources, etc.) when meeting quality of service objectives in an application environment. Also, the present invention provides for effectively supporting changing demands on the application environment.

Throughout the body of this Application, the term "computational resource" refers to resources such as, servers to include networking and database servers, host computers, database storage units, and the like.

Figure 2:
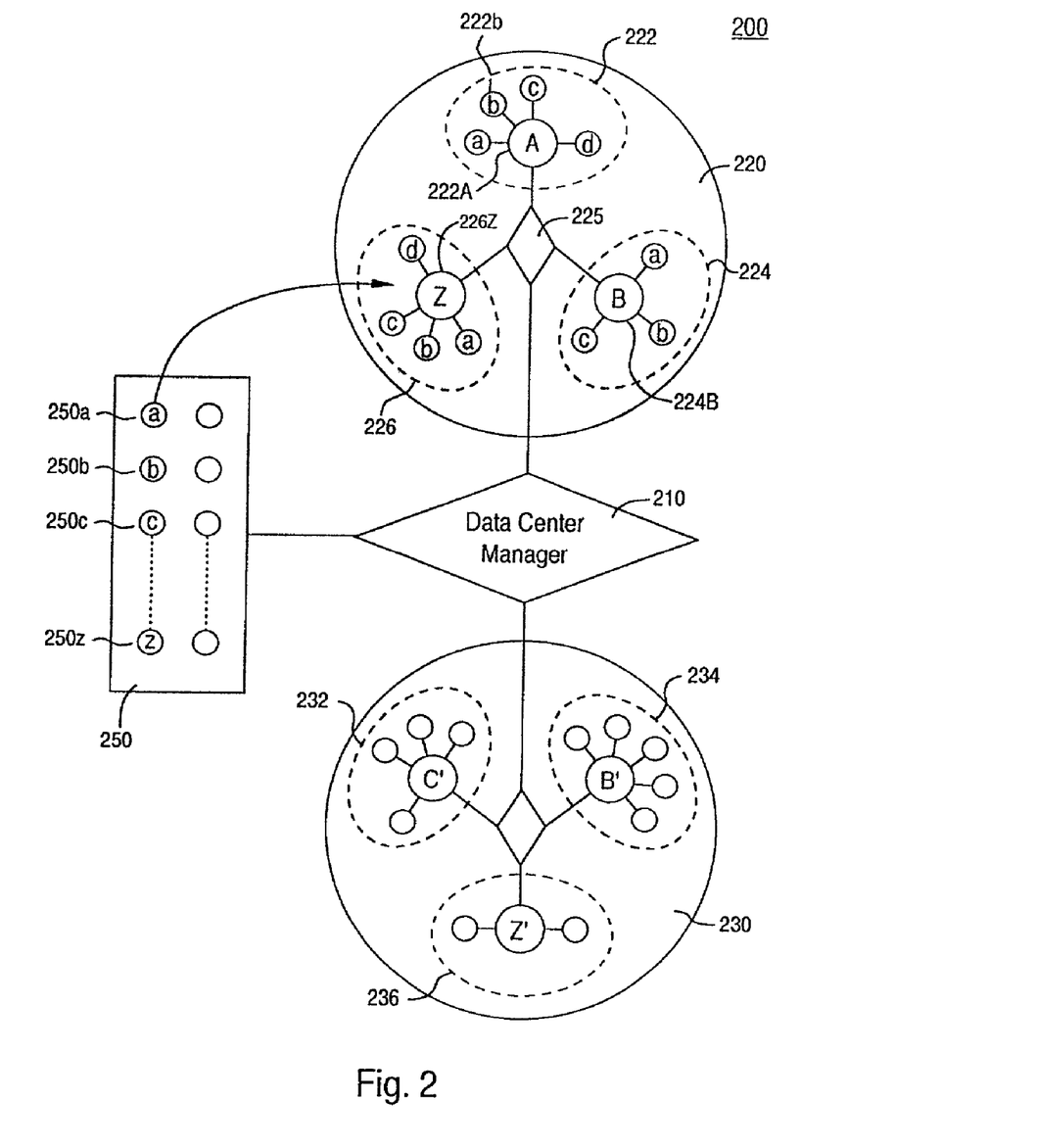
FIG. 2 illustrates a block diagram of a communication network having a plurality of application environments, in accordance with various embodiments of the present invention.

FIG. 2 illustrates a block diagram of an exemplary communication network 200 having a plurality of scalable, application environments, in accordance with one embodiment of the present invention. The network 200 is comprised of a plurality of computational resources, each of which could be located in different geographical locations. In one embodiment, the network 200 is a data center that supports multiple application environments, each of which are scalable.

Combining computational resources together with permanent connections, e.g., via cable, or temporarily through telephone or other communication links, form individual networks having computational resources. The computational resources are distributed at nodes that could be located in different geographical locations. An individual network comprised of various computational resources located on different nodes can support a particular application to form an application environment. Further, computational resources in a particular network can be added or deleted, as necessary, to make the application scalable.

Exemplary communication network 200 shows two application environments 220 and 230 that operate independently from each other. However, FIG. 2 is for purposes of illustration only, and exemplary network 200 could handle any number of application environments. In addition, network 200 may be comprised of multiple networks that are conjoined or adaptively coupled for supporting one or more application environments. Each of the networks are arranged to support various applications, such as, by adding resources including networking, storage, or communications resources, and the like.

As discussed previously, in one embodiment, application environments are characterized by one or more independent computer systems in one or more administrative domains that are loosely coupled by networks and cooperate to provide computational resources for a global application. The extent and capabilities of each administrative domain are usually determined by the network boundaries of each distinct supplier or service provider.

For example, to break down complexity for a web-based communication network, an application environment could comprise a multi-component system, where each component is an administrative domain. The components can include a web server component, an application component, a database component, among others. The application environment is descriptive of many web shopping systems, but is also applicable to local networks servicing specific business enterprises supporting a specific need, such as application environments set up specifically for processing payroll.

Referring back to FIG. 2, within each application environment, one or more administrative domains are provided, and hereinafter referred to as components. Each component is interconnected with at least one other component to form the application environment. In one embodiment, components are physically located in various networks in various geographical locations. In another embodiment, components are physically located in one electronic device (e.g., mainframe computer) that is partitioned into scalable, and flexibly sized virtual components.

For example, three components are interconnected to comprise application environment 220: component-A 222, component-B 224, and component-Z 226. Component-A 222 is comprised of computational resources at nodes 222a-d and is managed by a component manager-A at node 222A. Component-B 224 is comprised of computation resources at nodes 224a-c and is managed by a component manager-B at node 224B. Component-Z 226 is comprised of computational resources at nodes 226a-d and is managed by component manager-Z at node 226Z.

A dynamic resource manager 225 manages the monitoring of quality of service throughout the application network 220. In addition, in another embodiment, the dynamic resource manager 225 manages the resources needed for predicting response times for each of the components (e.g., components 222, 224, and 226) in application environment 220.

In another embodiment, the dynamic resource manager 225 manages the resources needed for modeling the application environment in order to determine the most optimum number of computational resources needed at each of the components (e.g., components 222, 224, and 226) to satisfy an objective of the application environment 220. In one embodiment of the present invention, an objective of the application environment 220 is to minimize the number of computational resources while maintaining service level objectives. Other embodiments of the present invention are well suited to many other objectives, such as, minimizing cost, maximizing throughput, etc.

Returning back to FIG. 2, three components are interconnected to comprise application environment 230: component-A' 232, component-B' 234, and component-Z' 236. Component-A' 232 is comprised of computational resources located at four separate nodes. Component-B' is comprised of computational resources located at five separate nodes. Component-Z' is comprised of computational resources located at two separate nodes. A dynamic resource manager 235 manages the monitoring of quality of service throughout the application network 230. In addition, in one embodiment, the dynamic resource manager 235 manages the resources needed to predict response times of the components (e.g. component 232, 234, and 236) and to model the application environment 230 for efficient allocation of resources.

Each of the nodes throughout an application environment contains a computational resource (e.g., server, storage unit, etc.). In one embodiment, the resources include a central processing unit, memory (e.g., one or more storage units), Input/Output interface, such as, a keyboard and display and network connection interface. Computational resources can be further combined into the various components of an application environment. Each of the components are structured to perform a particular function. For example, an application environment may comprise, among others, a web server component for handling web related connections, an application component for processing the request, and a database component for maintaining and storing data.

In a virtual network environment, where the computational resources are connected through logical or virtual connections, an exemplary data center manager 210 coordinates the distribution and allocation of computational resources between the various independent virtual networks or application environments. In this way, physical computational resources that originally are assigned to one application environment at one particular time may be assigned to another application environment at another time. Also, the computational resource may change functionality from one environment to another. As such, efficient use of the computational resources can be accomplished. Network 200 may contain at any particular time a pool 250 of available computational resources (e.g., computational resources 250a-z and beyond) ready to be integrated into the various application environments supported by the network 200. The data center manager 210 communicates directly with each of the component managers in each of the application environments (e.g., environments 220 and 230) in the network 200 to coordinate the allocation and removal of computational resources (e.g., servers, storage units, etc.) from those components.

Middleware applications allow for the different nodes in an application environment to recognize and communicate with each other. Advances in middleware allow for the formation of scalable virtual networks (e.g., an application environment) that can expand and contract. The expansion and contraction occurs transparently to the user of the application environment. For example, the addition of a computational resource to an application environment requires that each of the components and various nodes in those components in the application environment recognize the new computational resource in order to fully utilize the new resources in supporting the application. In this way, the data center (e.g., network 200) that supports multiple application environments can be provisioned for peak loads, instead of having each application environment (e.g., environment 220 or 230) individually provisioned for peak loads.

Middleware applications implement the necessary application programming interfaces to integrate the new computational resource into the application environment. As such, a new computational resource that is added to a database component is recognized by the application component and the other components of the application environment and vice versa. Similarly, middleware allows for the seamless and transparent removal of computational resources from an application environment.

For example, application environment 220, to meet increased user demand, may require the integration of an available computational resource 250a from the pool 250 of available servers. The computational resource 250a may be added to component-Z 226. Middleware allows for communication between the component manager-Z at node 226Z of environment 220 and the data center manager 210 to coordinate the assignment of computational resource 250a to component-Z 226 at a new node 226e (not shown). Middleware allows for the further integration of server 250a into the application environment 220 as a whole.

Various embodiments of the present invention utilize service level objectives that define performance objectives, or quality of service (QOS), for each of the various application environments in a communication network (e.g. network 200). The service level objectives can be compared against quality of service metrics that are defined as response time metrics, in one embodiment. These response time metrics can be predicted from quality of service metrics, such as throughput metrics and utilization metrics, that may be collected and measured at the local component and system wide levels for an application environment.

In this way, QOS performance for each local component in an application environment can be identified and diagnosed based on information obtained by the metrics, in one embodiment. In another embodiment, QOS performance on a system-wide level for the application environment can be identified and diagnosed. The QOS performance can occur over a specific interval based on time, data collected, etc. A performance metric is a unit of measurement for obtaining and analyzing the levels of quality of service and performance received.

Figure 3:
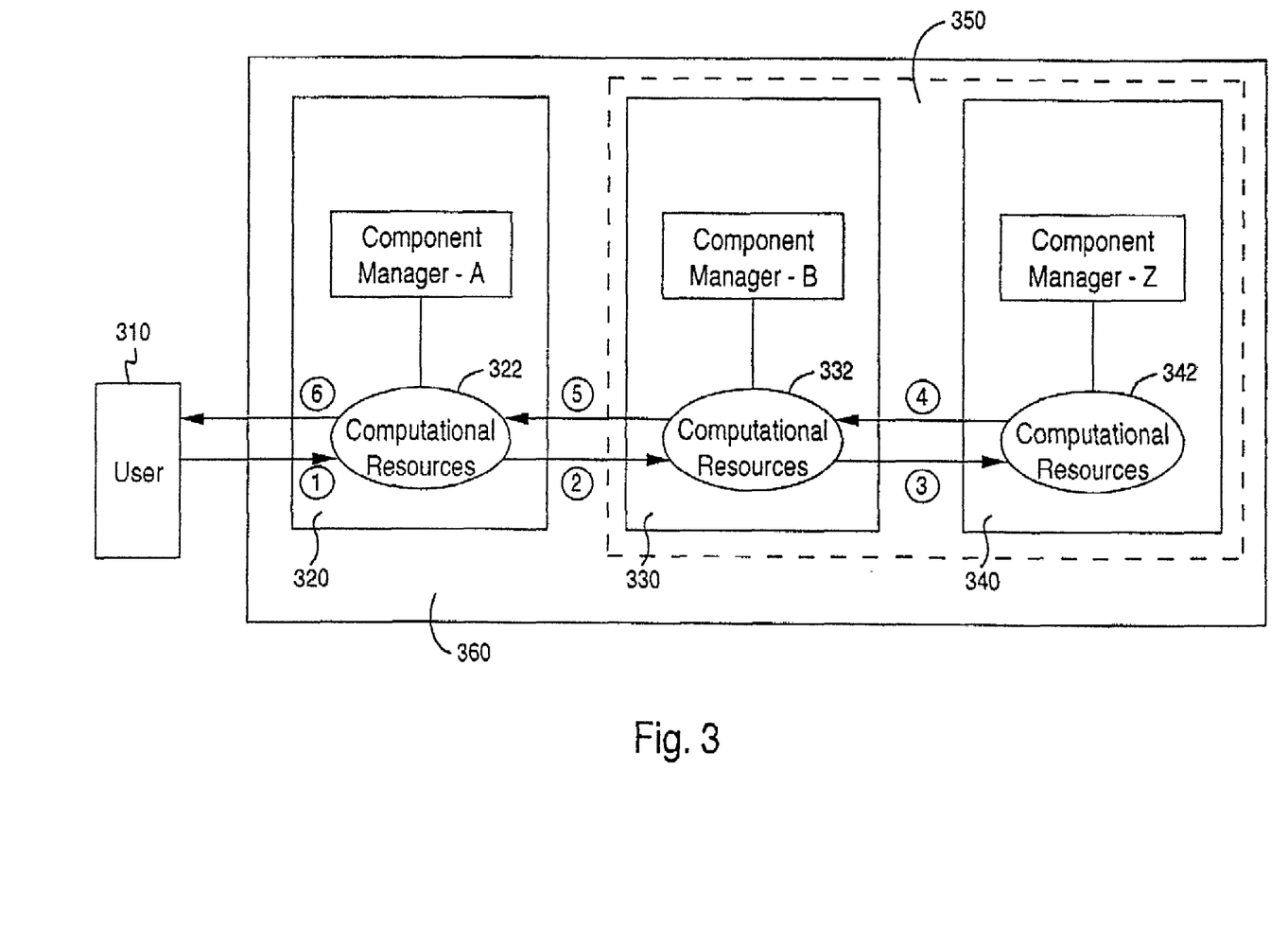
FIG. 3 is a data flow diagram illustrating system, subsystem and local service level objectives, in accordance with various embodiments of the present invention.
Figure 5:
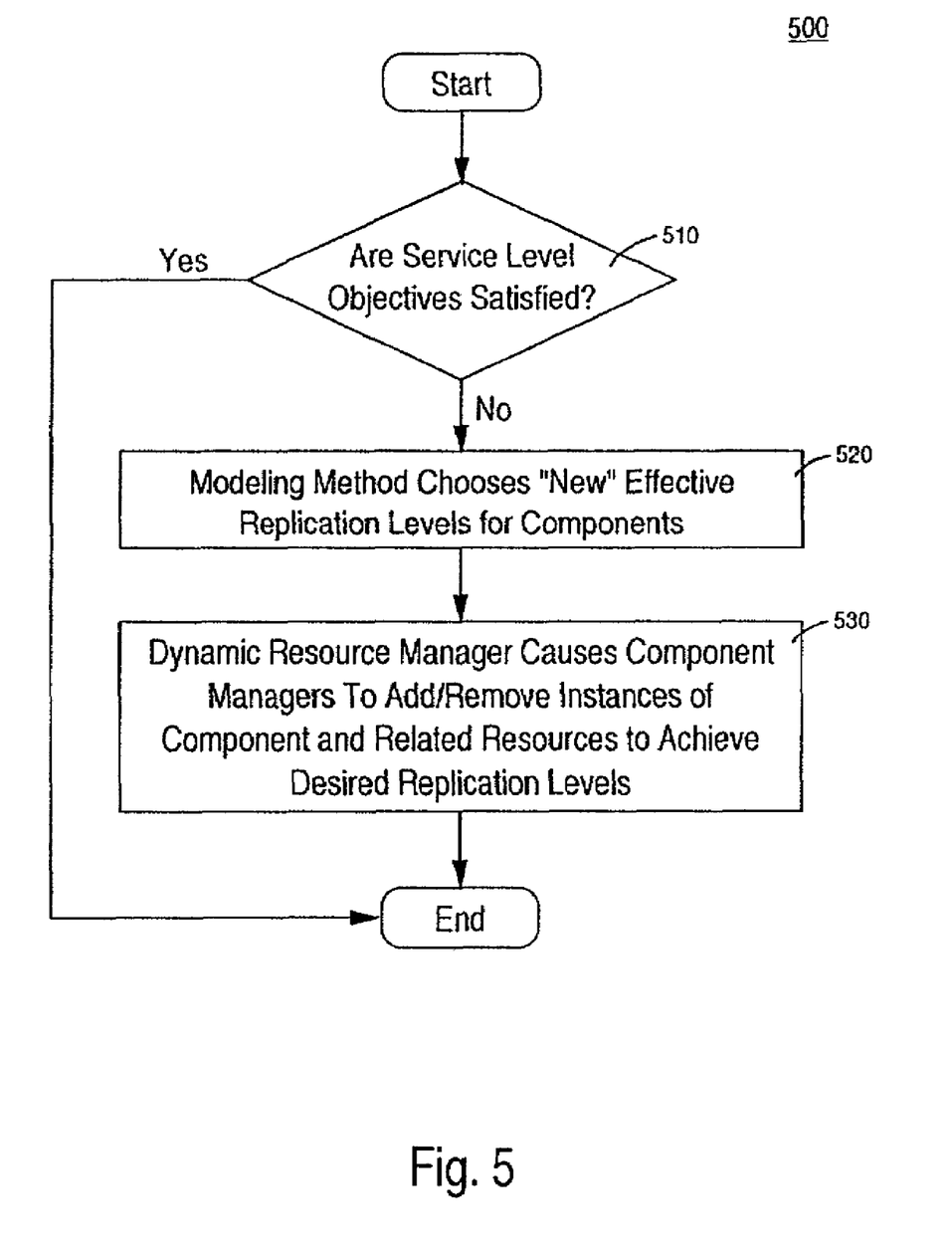
FIG. 5 is a flow diagram illustrating steps in a method for ensuring efficient use of computational resources in an application environment, in accordance with one embodiment of the present invention.

FIG. 5 in combination with FIG. 3 illustrate the use of response time metrics for defining QOS service level objectives in an exemplary application environment 220. Flow chart 500 in FIG. 5 illustrates steps in a method that involves the prediction of response time metrics for ensuring a sufficient number of computational resources are provided at each of a plurality of components within an application environment, in accordance with one embodiment of the present invention. FIG. 3 is a block diagram illustrating the various combinations of QOS measurements used in qualifying service level objectives for the application environment 360.

Referring now to FIG. 3, a data flow diagram for processing a user request at an application environment 360 illustrates the measurement of quality of service metrics in order to determine whether system, subsystem, or local service level objectives are satisfied. In FIG. 3, application environment 360 is comprised of component-A 320, component-B 330, and component-C 340.

FIG. 3 illustrates quality of service metrics in conjunction with processing a request from a user 310 that is supported by the application environment 360, in accordance with one embodiment of the present invention. In step 1, a generalized user request comes into the application environment 360 and is received at computational resources 322 located at component-A 320. By way of example, the request may be an order request for goods or services over a web shopping network. Component-A 320 may be the web server component which creates the connection between the user 310 and the application environment 360.

The computational resources 322 are utilized to process the request at component-A 320. For example, CPU and memory may be used in component-A 320. Time and resources spent establishing the connection and utilizing resources at component-A 320 are defined as local performance of service, as measured by local quality of service metrics, for the component. For example, in one embodiment, throughput and utilization metrics are measured.

In step 2 of FIG. 3, the processing of the request then flows to computational resources 332 at component-B 330 in the application environment 360. Component-B 330 may comprise the application servers for performing the data manipulation of the request (e.g., processing an order request for goods). Computational resources 332 are utilized to process the request at component-B 330. For example, CPU and memory may be used in component-B 330 to process an order request for goods in a web shopping environment. At this point another local performance of service, as defined by quality of service metrics, is measured in reference to component-B 330. For example, in one embodiment, throughput and utilization metrics are measured. Performance of service at the component-A 320 is suspended.

In step 3 of FIG. 3, the processing of the request then flows to computational resources 342 at component-Z 340 in the application environment 360. Component-Z 340 may comprise the database servers that perform the accessing and storing of data (e.g., managing an inventory account of goods). Computational resources 342 are utilized to process the request at component-Z 340. For example, CPU and memory may be used in component-Z 340 to access and store inventory data. At this point another local performance of service, as defined by quality of service metrics, is measured in reference to component-Z 340. For example, in one embodiment, throughput and utilization metrics are measured. Performance of service at the component-A 320 and component-B 330 are suspended.

In step 4, the reply from component-Z 340 (e.g., accessing data) is sent back to component-B 330 for further processing by component-B 330. In step 5 the reply from component-B 330 (e.g., a confirmation of the order request) is sent back to component-A 320. In step 6, the reply from the application environment 360 is sent back to the user 310.

As a result, for a particular I/O operation, performance of the application environment (e.g., environment 360) can be broken down into various processing times that are measured by quality of service metrics for the entire system or for various subsystems contained within the application environment. In addition, performance can be broken down in to various local processing times that are measured by quality of service metrics for each of the components in the application environment.

The services at each of the components (e.g., 320, 330, and 340) in the application environment 360 may or may not be performed depending on the request from the user 310 at any particular time. As a result, measurement of QOS metrics will be different depending on the workload intensity and the mix of the types of requests encountered by the application environment 360.

Referring now to FIG. 5, in condition step 510 of flow chart 500, the present embodiment determines whether service level objectives are satisfied for a system (e.g., an application environment). The service level objectives can be assigned for the system as a whole, and/or for various subsystems contained within the system.

In one embodiment, the system service level objectives (SLOs) are previously assigned for the system as a whole. The system SLO is a performance objective defined on an end to end basis for the entire system. For example, referring now to FIG. 3, performance on a request that is received by a system is measured from the moment the system recognizes the request at component-A 320 at step 1, processes the request throughout the application environment 360, and then transmits a response back to the originator of the request at step 6.

If the system SLO is not satisfied, additional computational resources can be added anywhere within the system (e.g., application environment 360) in order to ensure the system SLO is satisfied.

In addition, the system SLOs can include end to end measurements of performance of various subsystems within the application environment 360. As such, performance on a request that is received by the system is only measured from one point within the system. For example, referring now to FIG. 3, a subsystem SLO may only analyze performance for the subsystem 350. Subsystem 350 contains component-B 330 and everything beyond component-B 330 (e.g., component Z 340) that is contained within the system or application environment 360. In that case, performance is measured from the moment computational resources at component-B 330 receives the request at step 2 on up to the moment component-B 330 completely finishes processing that request and passes its response to the request back to component-A 320 at step 5.

By including a subsystem SLO, optimization of the application environment 360 can be further pinpointed to within the subsystem 350. For example, if performance QOS of the application environment 360 does not satisfy a system SLO, then an optimization process first analyses the performance within the subsystem 350, in one embodiment. If subsystem 350 does not satisfy its subsystem SLO, then computational resources can be initially added to the subsystem 350 in order to satisfy its subsystem SLO, and correspondingly the system SLO. Thereafter, if the system SLO still is not satisfied, even after satisfying the subsystem SLO, then additional computational resources can be added throughout the entire application environment as needed.

Additionally, although the system SLO may be satisfied, if a particular subsystem SLO (e.g., for subsystem 350) is not satisfied, the subsystem can be optimized with additional computational resources to satisfy its subsystem SLO.

Still further, in one embodiment, service level objectives are determined on a localized basis per each component (e.g., components 320, 330, and 340 of FIG. 3) for the application environment 360. As such, optimization can be further pinpointed to a particular localized component within the application environment 360. As before, optimization of the system 360 may first look to see if SLOs on a localized basis are satisfied when system SLOs are not satisfied, in one embodiment. In addition, even though system SLOs are satisfied, if SLOs for local components are not satisfied, computational resources at those components can be added to optimize the system at those components.

Embodiments of the present invention are well suited to optimizing the number of computational resources within an application environment (e.g., environment 360) using any combination of system, subsystem, and local SLO optimization.

In step 520 of flow chart 500, the present embodiment models the application environment when particular service level objectives are not met. Based on workload intensity and the resource intensive mix of requests encountered by the application environment, a predictive modeling technique is used to determine the most effective number of replicates (e.g., computational resources) needed within each component of the application environment in order to satisfy the service level objectives. The new effective number of replicates is defined by an objective function, in one embodiment.

In step 530 of flow chart 500, the present embodiment, through the dynamic resource manager associated with the application environment, causes respective component managers within the application environment to change the number of replicates to attain their desired effective number of replicates. As such, service level objectives are maintained and satisfied on a system, subsystem, and/or local level.

The service level objectives can be a measure of quality of service metrics, such as, processing time on a local component level, or on the system as a whole, in an application environment. For example, response time service level objectives can be a measure of service demand and queuing time for access to resources at one or more components (e.g., time waiting for access to the local CPU, time spent accessing memory, time spent accessing I/O interface, etc.). For purposes of this Application, metrics are used to identify performance measurement characterizing quality of service both on a system, subsystem, and localized basis.

As such, a system service level objective can be designed for the entire application environment 360. Further, a subsystem service level objective can be designed for the subsystem 350. In addition, local service level objectives can be defined for each of the components (e.g., components 320, 330, and 340) of the application environment 360.

Figure 4:
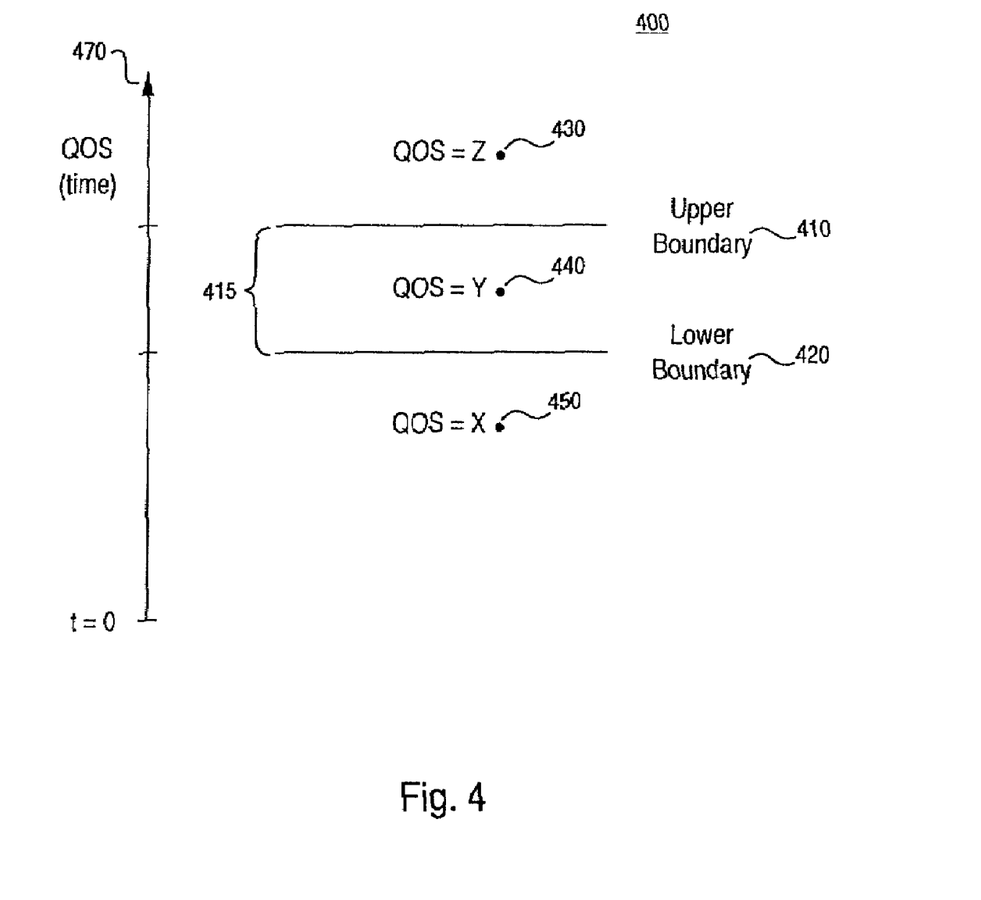
FIG. 4 is a graphical representation of an interval for a service level objective in relation to metrics that are measured as a function of time, in accordance with various embodiments of the present invention.

FIG. 4 is a graphical representation of the threshold boundaries that define an interval for a service level objective, in accordance with one embodiment of the present invention. In one embodiment, the graph 400 illustrates a response-time metric that measures performance of service (quality of service) at a system, subsystem, or local component of an application environment.

In the present embodiment, the response-time metric is a measurement or estimate of time spent using resources in processing a request or requests along the y-axis 470. Other embodiments of the present invention are well suited to parameters other than time that measure performance or quality of service.

A service level objective is represented by the upper and lower boundaries 410 and 420 respectively. The service level objective can be represented as an interval 415 as defined by the upper and lower boundaries 410 and 420 respectively. The upper boundary represents the maximum amount of time that can be spent processing for a particular data interval (e.g. a processing a single request) while still satisfying the service level objective. The lower boundary represents a minimum amount of time needed that is spent processing for that particular data interval. Going below the lower boundary exceeds the service level objective indicating too many computational resources are being utilized.

In one embodiment of the present invention, defining a system-wide service level objective provides a benchmark for ensuring an adequate number of computation resources are utilized in an application environment. As long as the right number of computational resources are assigned, the corresponding system service level objective will be satisfied. In this way, on a system wide basis, the effective number of replicates for each component may not change as long as the system-wide service level objective is satisfied.

In another embodiment, the system-wide service level objective is satisfied even though a service level objective for a subsystem or local component of the application environment may not be satisfied; in other words, that subsystem or local component is underperforming. As long as the system-wide service level objective is satisfied, the present arrangement of effective number of replicates for each component of the application environment need not be modified.

In still another embodiment of the present invention, the effective number of replicates for each subsystem or local component of the application environment may still be modified even though the system-wide service level objective is satisfied to incrementally improve the performance of the application environment. Depending on the modeling technique used, a new effective number of replicates is created to improve the performance of the application environment. In one embodiment, the new effective number of replicates improves performance on a subsystem or local component level such that previously underperforming subsystems or local components now have a sufficient number of replicates to satisfy a subsystem or local component service level objective, respectively. Continued modification of the effective number of replicates are made in an iterative process in order to satisfy system-wide, subsystem, or local service level objectives optimizing use of resources.

Returning now to FIG. 4, point-Z 430 shows that the response-time metrics characterizing performance of service does not satisfy the service level objective. Point-Z 430 indicates that too much time is spent on processing for the particular data interval. As such, point-Z 430 exceeds the interval 415 as set by the upper and lower boundaries 410 and 420, respectively. Exceeding the interval 415 indicates that computational resources need to be added to the application environment.

Conversely, point-X 450 in FIG. 4 shows that the response-time metrics characterizing performance of service exceed the service level objective. Point-X 450 indicates that too little time is spent on processing for the particular data interval. As such point-X 420 falls short of the interval 415 as set by the upper and lower boundaries 410 and 420, respectively. Falling short of the interval 415 indicates that computational resources needed to be removed from the application environment. The removed computational resources can be utilized in other application environments within the communication network that are not meeting their service level objectives. The choice of computational resources removed may be based on an objective function that considers resource requirements of other applications within the communication network.

In this way, by satisfying the interval 415, only sufficient computational resources are used. By following the service level objectives for an application environment, only sufficient computational resources are used by the multi-component application environment. Furthermore, by ensuring only sufficient amounts of computational resources are used in satisfying service level objectives, pools of unused resources can be created and made available for sharing by other application environments that need those available resources.

Figure 6:
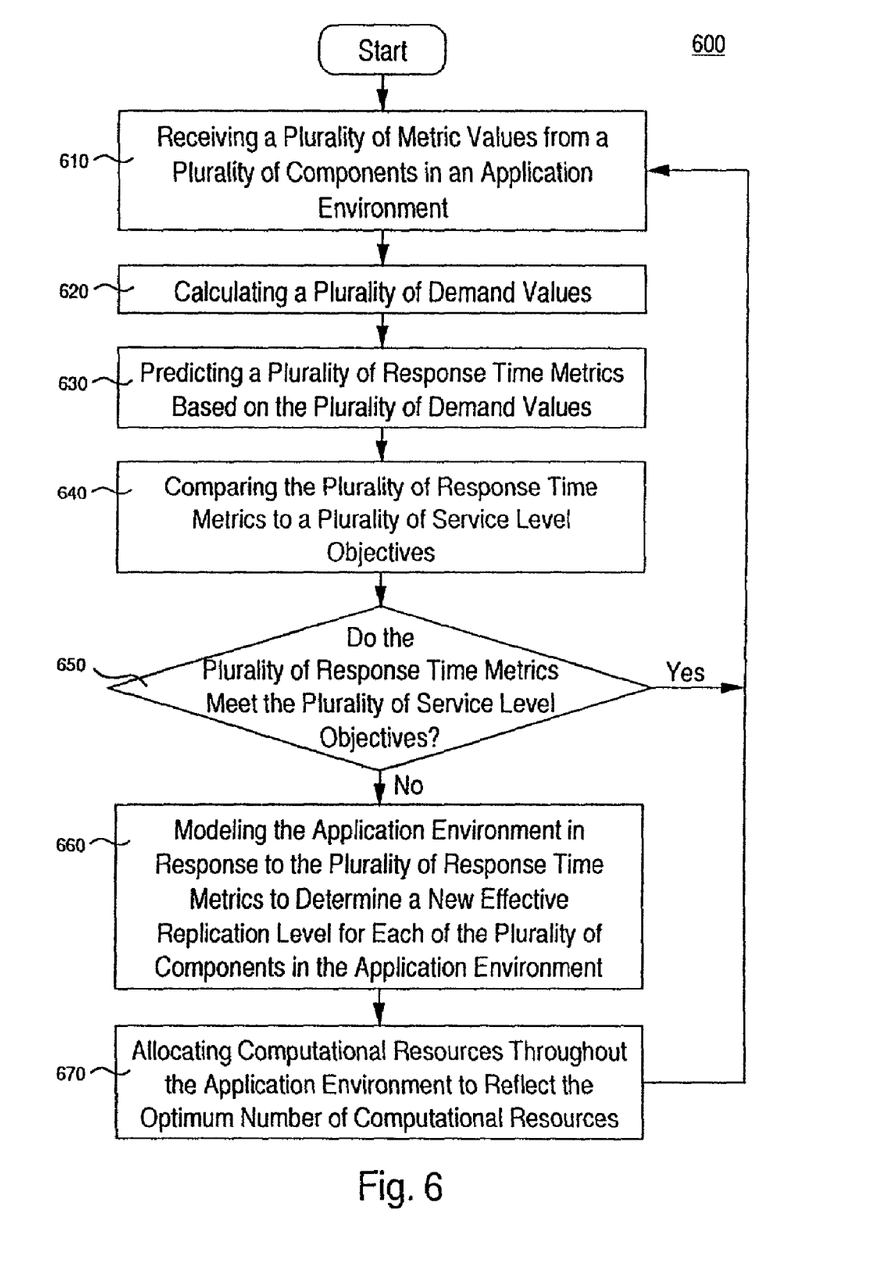
FIG. 6 is a flow diagram illustrating steps in a method for ensuring a sufficient number of computational resources are allocated to satisfy service level objectives in an application environment, in accordance with one embodiment of the present invention.

FIG. 6 is a flow diagram 600 illustrating steps in a method for ensuring resource sharing of computational resources among a plurality of application environments, in accordance with one embodiment of the present invention. The present embodiment exploits service level objectives to limit the capacity of resources associated with one or more application environments.

The present embodiment exploits a feedback loop that compares and analyses predicted system performance of service against system-wide service level objectives. By focusing on system service level objectives, the performance of each component is less important than the performance of the system-wide application environment.

Depending on workload intensity and mix, the effective number of replicates (e.g., computational resources) for the application environment can change over time. The present embodiment ensures that only sufficient computational resources are allocated to components within the application environment as needed in order to satisfy service level objectives at a particular point in time. This permits the capacity of the computational resources associated with each component to fluctuate according to demands on the application environment. The application environment and corresponding number of computational resources are constantly changing due to fluctuations in user demand, a change in the kinds of work being performed in that environment, among others.

The present embodiment implements the method of flow chart 600 in a system similar to the exemplary communication system 200 of FIG. 2. In step 610, the present embodiment receives metrics from a plurality of components in an application environment, in step 510. In one embodiment, the dynamic resource manager for the application environment controls the allocation of computational resources. As such, each of the component managers is responsible for sending the metrics to a dynamic resource manager associated with the application environment on a design specific periodic basis. The component managers can also send the metrics upon a request for such from the dynamic resource manager, in accordance with another embodiment of the present invention. Also, the dynamic resource manager may be located on an independent node of the application environment, in one embodiment.

In step 620 of flow chart 600, the present embodiment calculates a plurality of demand values that are quality of service metrics. The demand metrics can be calculated or determined from measured quality of service metrics obtained from each of the components of the application environment. In one embodiment, the dynamic resource manager controls the resources to calculate the plurality of demand values.

In one embodiment, the demand metrics are related to the throughput metrics and utilization metrics. The throughput metrics are defined as the number of computations per unit time. The utilization metrics are defined as a percentage of the amount of time a resource, on a unit or system-wide level, is utilized. In another embodiment, the demand metric is related to the throughput metric and utilization metric by the following function:

$$\text{Demand Metric}=(\text{Utilization Metric})/(\text{Throughput Metric}) \quad (1)$$

In step 630, the present embodiment, through the dynamic resource manager, predicts a plurality of response time metrics based on the plurality of demand values that are calculated in step 620. In one embodiment, the plurality of demand values are inputted in to the predictive modeling technique to determine the plurality of response time metrics. In another embodiment, some or all of the response time metrics can be measured directly within the application environment.

In step 640, the present embodiment, via resources controlled by the dynamic resource manager, compares the plurality of response time metrics to a plurality of service level objectives. The plurality of service level objectives are previously assigned at a system-wide level, in one embodiment. In another embodiment, the plurality of service level objectives are previously assigned at a system and/or sub-system level. In still another embodiment, the plurality of service level objective are previously assigned at the system, subsystem, and at particular local component levels as needed to ensure quality of performance throughout the application environment.

In condition step 650 of flow chart 600, the present embodiment, through the dynamic resource manager, determines whether the plurality of response time metrics meet the plurality of service level objectives. If the plurality of service level objectives are met, then the control loop illustrated by flow chart 600 returns back to step 610 and awaits the reception of further performance values from the application environment.

On the other hand, if the plurality of service levels are not satisfied, then the present embodiment, through resources controlled by the dynamic resource manager, proceeds to step 660 and models the application environment in response to the plurality of response time metrics. The function of the model is to replicate the functionality of the application environment under varying distributions of computational resources throughout the components in response to the conditions presented to the application environment as represented by the predicted response time metrics.

The model is used by the dynamic resource manager to determine the most effective number of replicates of each application component to satisfy the plurality of service level objectives, in accordance with one embodiment of the present invention. Various distributions of computational resources throughout the components of the application environment will present satisfactory performance within the global, system-wide service level objective. The model can help distinguish between the various distributions to determine the most effective distribution of computational resources that not only satisfies the global, system-wide service level objective, but also the various other local component service level objectives of importance in the plurality of service level objectives.

In one embodiment, the model implemented by the dynamic resource manager is a mathematical model that is based on an objective function desired for the application environment. The model can be designed to satisfy any type of objective function. For example, the model may be designed to provide the optimum distribution of computational resources throughout the application environment to reduce cost, in one embodiment. In another embodiment, the objective function may be to use the smallest number of computational resources. In still another embodiment, the objective function is a combination of cost reduction and implementation of the smallest number of computational resources, or to make available computational resources to other applications in other application environments.

The mathematical model is based on various optimization techniques well known to those well versed in the art. In one embodiment, the mathematical model is a heuristic model. In another embodiment, the mathematical model implemented is an extended queuing network model. In still another embodiment, the mathematical model implemented by the dynamic resource manager is a layered queuing model. In another embodiment, the mathematical model implemented is a statistical model.

In another embodiment, the model implemented to replicate the application environment is a simulation model. Simulation models tend to replicate the application environment in more detail; however, the simulation model is not as fast computationally as corresponding mathematical models.

In step 670 of flow chart 600, the present embodiment allocates computational resources throughout the application environment to reflect the new effective number of replicates (e.g., computational resources) for each component of the application environment as determined by the model in step 660. The dynamic resource manager causes component managers to change the number of replicates of each component to attain their desired level of computational resources in order to satisfy service level objectives, in accordance with one embodiment.

For example, referring back to FIG. 2, the new effective number of computational resources may indicate that component-A 222 is utilizing too many computational resources. In that case, the dynamic resource manager will notify the component manager-A (e.g., manager 222A of FIG. 2) to remove the computational resource-c at node 222c in component 222. The component manager-A receives the notification message and using its own resources, communicates with the data center manager (e.g., manager 210) to reallocate the computational resource-c at node 222c to one of a plurality of computational resource pools managed by the data center manager. The resource that is removed and reallocated to a resource pool is now available for use by another application environment that is not meeting its service level objectives.

In another embodiment, the new effective number of computational resources may indicate that the application environment needs more computational resources. For example, referring back to FIG. 2, the new effective number of computational resources may indicate that component-Z 226 needs another computational resource. In that case, the dynamic resource manager will notify the component manager-Z (e.g., manager-Z at node 226Z) to add a computational resource. The component manager-Z receives the notification message and using its own resources communicates with the data center manager (e.g., manager 210) to allocate a computational resource (e.g., resource 250a) to the cluster of resources at component-Z.

The process in flow chart 600 repeats itself with every receipt of a metric at the dynamic resource manager associated with an application environment, in accordance with one embodiment. Grouping the received metric with other corresponding metrics, the method outlined in flow chart 600 is able to dynamically maintain the most effective number of replicates of each application component as needed to satisfy service level objective. In this way, the present embodiment ensures that only sufficient computational resources are used to meet service level objectives for each of the components in an application environment at any particular moment in time.

While the methods of embodiments illustrated in flow charts 500 and 600 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for enabling resource sharing in a network having a plurality of application environments, is thus described. While the present invention has been described in particular embodiments, it should be appreciated that the present invention should not be construed as limited by such embodiments, but rather construed according to the below claims.

What is claimed is:

1. A method of resource allocation comprising:
  a) calculating a plurality of demand values for a plurality of components, wherein said plurality of demand values is calculated from a combination of throughput and utilization metrics, wherein said components are communicatively coupled in series, wherein processing of a request from a user received at a first component of said plurality of components proceeds forward through said components to a last component in said series and then backward through said components to said first component and then to said user, wherein a performance of service is suspended at each of said components after said processing of a request by said each of said components, and wherein said metrics are measurable at points between said components;
  b) predicting a plurality of response time metrics for said plurality of components based on said plurality of demand values;
  c) modeling said plurality of components based on an objective function that responds to conditions as represented by said plurality of response time metrics when at least one of said plurality of response time metrics does not satisfy at least one of a plurality of service level objectives to determine a new effective distribution of computational resources throughout said plurality of components such that said plurality of components that are modeled satisfies said plurality of service level objectives; and
  d) allocating computational resources throughout said plurality of components to reflect said new effective distribution.

2. The method as described in claim 1, wherein said plurality of components comprise an application environment.

3. The method as described in claim 1, wherein said at least one of a plurality of service level objectives applies to said plurality of components on a system-wide basis.

4. The method as described in claim 1, wherein said at least one of a plurality of service level objectives applies to said plurality of components on a subsystem basis.

5. The method as described in claim 1, wherein said at least one of a plurality of service level objectives applies to one of said plurality of components.

6. The method as described in claim 1, wherein a) further comprises:
  receiving a plurality of metric values from said plurality of components, said plurality of metric values used to calculate said demand values.

7. The method as described in claim 1, wherein c) comprises:
  inputting said plurality of demand values into a predictive model to determine said new effective distribution of computational resources.

8. The method as described in claim 1, wherein d) comprises:
  removing computational resources from said plurality of components.

9. The method as described in claim 1, wherein d) comprises:
  adding computational resources to said plurality of components.

10. A method of resource allocation in an application environment comprising:
  a) receiving a plurality of metric values from a plurality of components of said application environment, wherein said components are communicatively coupled in series, wherein processing of a request from a user received at a first component of said plurality of components proceeds forward through said components to a last component in said series and then backward through said components to said first component and then to said user, wherein a performance of service is suspended at each of said components after said processing of a request by said each of said components, and wherein said metric values are measurable at points between said components;
  b) calculating a plurality of demand values from said plurality of metric values;
  c) predicting a plurality of response time metrics for each of said plurality of components based on said plurality of demand values;
  d) modeling said plurality of components based on an objective function that responds to conditions as represented by said plurality of response time metrics when at least one of said plurality of response time metrics does not satisfy at least one of a plurality of service level objectives applying to said plurality of components on a system level to determine a new effective distribution of computational resources for said plurality of components such that response time metrics associated with said plurality of components that are modeled satisfies said plurality of service level objective, wherein said new effective distributions results in an optimum number of said plurality of components; and
  e) allocating computational resources throughout said plurality of components to reflect said optimum number.

11. The method of resource allocation as described in claim 10, wherein d) further comprises:
  determining a plurality of optimum numbers of computational resources, one for each of said plurality of components, that represents said new effective distribution of computational resources.

12. The method of resource allocation as described in claim 10, wherein e) comprises:
   removing computational resources from said plurality of components.

13. The method as described in claim 10, wherein e) comprises:
   adding computational resources to said plurality of components.

14. The method as described in claim 10, wherein c) comprises:
   predicting said plurality of response time metrics using a prediction modeling technique.

15. The method as described in claim 14, wherein said plurality of metric values includes throughput metrics and utilization metrics.

16. The method as described in claim 10, wherein c) comprises:
   inputting said plurality of demand values into a predictive model to determine said optimum number.

17. A computer system comprising:
   a processor;
   a computer readable memory coupled to said processor and containing program instructions that, when executed, implement a method of resource allocation comprising:
   a) calculating a plurality of demand values for a plurality of components, wherein said plurality of demand values is calculated from a combination of throughput and utilization metrics, wherein said components are communicatively coupled in series, wherein processing of a request from a user received at a first component of said plurality of components proceeds forward through said components to a last component in said series and then backward through said components to said first component and then to said user, wherein a performance of service is suspended at each of said components after said processing of a request by said each of said components, and wherein said metrics are measurable at points between said components;
   b) predicting a plurality of response time metrics for said plurality of components based on said plurality of demand values;
   c) modeling said plurality of components based on an objective function that responds to conditions as represented by said plurality of response time metrics when at least one of said plurality of response time metrics does not satisfy at least one of a plurality of service level objectives to determine a new effective distribution of computational resources throughout said plurality of components such that said plurality of components that are modeled satisfies said plurality of service level objectives; and
   d) allocating computational resources throughout said plurality of components to reflect said new effective distribution.

18. The computer system as described in claim 17, wherein said plurality of components comprise an application environment.

19. The computer system as described in claim 17, wherein said at least one of a plurality of service level objectives applies to said plurality of components on a system-wide basis.

20. The computer system as described in claim 17, wherein said at least one of a plurality of service level objectives applies to said plurality of components on a subsystem basis.

21. The computer system as described in claim 17, wherein said at least one of a plurality of service level objectives applies to one of said plurality of components.

22. The computer system as described in claim 17, wherein a) in said method of resource allocation further comprises:
   receiving a plurality of metric values from said plurality of components, said plurality of metric values used to calculate said demand values.

23. The computer system as described in claim 17, wherein c) in said method of resource allocation comprises:
   inputting said plurality of demand values into a predictive model to determine said new effective distribution of computational resources.

24. The computer system as described in claim 17, wherein d) in said method of resource allocation comprises:
   removing computational resources from said plurality of components.

25. The computer system as described in claim 17, wherein d) in said method of resource allocation comprises:
   adding computational resources to said plurality of components.

26. A communication network comprising:
   a plurality of computational resources;
   an application environment having a plurality of network nodes coupled together;
   a plurality of components in said application environment servicing an application, each of said plurality of components including at least one computational resource from said plurality of computational resources, each of said plurality of components residing on one of said plurality of network nodes, wherein said components are communicatively coupled in series, wherein processing of a request from a user received at a first component of said plurality of components proceeds forward through said components to a last component in said series and then backward through said components to said first component and then to said user, wherein a performance of service is suspended at each of said components after said processing of a request by said each of said components;
   a plurality of metrics measured at each of said plurality of components for calculating a plurality of demand values, wherein said metrics are measurable at points between said components, wherein said plurality of demand values is calculated from a combination of throughput and utilization metrics;
   a functional objective for defining an optimum number of computational resources in said application environment; and
   a dynamic resource manager coupled to said application environment for modeling said plurality of components based on said functional objective that responds to conditions as represented by said plurality of demand values when at least one of said plurality of demand values does not satisfy at least one of a plurality of service level objectives to determine a new effective distribution of computational resources throughout each of said plurality of components such that said plurality of components that are modeled satisfies said plurality of service level objectives.

27. The communication network as described in claim 26, wherein said plurality of metrics comprises throughput metrics and utilization metrics.

28. The communication network as described in claim 26, further comprising:
   a prediction model for predicting a plurality of response time metrics for said plurality of components based on said plurality of demand values; and
   a mathematical model for modeling said plurality of components in response to said plurality of response time metrics for determining said new effective distribution of computational resources.

29. The communication network as described in claim 26, further comprising:
   a plurality of component managers, one for each of said plurality of components, for managing the addition and removal of computational resources in said plurality of components in response to notices from said dynamic resource manager.

30. The communication network as described in claim 26, wherein said plurality of components comprise a local area network (LAN).

* * * * *